United States Patent
Ningrat et al.

(10) Patent No.: US 9,977,546 B2
(45) Date of Patent: May 22, 2018

(54) DETERMINING FINGER SEPARATION THROUGH GROOVE ANALYSIS IN A TOUCH SCREEN DEVICE

(71) Applicant: STMICROELECTRONICS ASIA PACIFIC PTE LTD, Singapore (SG)

(72) Inventors: Kusuma Adi Ningrat, Seoul (KR); Manivannan Ponnarasu, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 129 days.

(21) Appl. No.: 14/319,715

(22) Filed: Jun. 30, 2014

(65) Prior Publication Data
US 2015/0378497 A1    Dec. 31, 2015

(51) Int. Cl.
*G06F 3/041*    (2006.01)
*G06F 3/044*    (2006.01)

(52) U.S. Cl.
CPC .............. *G06F 3/044* (2013.01); *G06F 3/041* (2013.01); *G06F 3/0418* (2013.01); *G06F 2203/04104* (2013.01); *G06F 2203/04108* (2013.01)

(58) Field of Classification Search
None
See application file for complete search history.

(56) References Cited

U.S. PATENT DOCUMENTS

| | | | | |
|---|---|---|---|---|
| 2008/0309629 A1* | 12/2008 | Westerman | ............. | G06F 3/038 345/173 |
| 2010/0097328 A1* | 4/2010 | Simmons | ............. | G06F 3/0416 345/173 |
| 2010/0295810 A1* | 11/2010 | Nagata | ................. | G06F 3/0416 345/173 |
| 2012/0044204 A1* | 2/2012 | Hashimoto | ........... | G06F 3/0416 345/174 |
| 2013/0016045 A1* | 1/2013 | Zhao | ..................... | G06F 3/0416 345/173 |
| 2013/0106732 A1* | 5/2013 | Chao | ..................... | G06F 3/0416 345/173 |
| 2013/0169561 A1* | 7/2013 | Park | ..................... | G06F 3/0488 345/173 |
| 2014/0035859 A1* | 2/2014 | Wilson | .................. | G01R 27/26 345/174 |
| 2015/0253913 A1* | 9/2015 | Oh | ........................ | G06F 3/0412 349/12 |

* cited by examiner

*Primary Examiner* — Kent Chang
*Assistant Examiner* — Benjamin Morales Fernande
(74) *Attorney, Agent, or Firm* — Crowe & Dunlevy

(57) ABSTRACT

Groove analysis in a device having a tactile input surface suited to detect more than one tactile input at a time. Using groove analysis allows a touch screen device a more robust and efficient algorithm for distinguishing between two different tactile inputs. The touch screen device may include a touch screen controller that includes an analysis circuit for determining grooves between touch inputs. Generally, when a touch input is received at the surface of a touch screen device, the touch screen may register touch strength signals at each of a plurality of touch regions. A groove may be generally defined as a touch region that exhibits a touch strength signal that is less than surrounding touch regions. Once all touch regions are analyzed by a groove analysis, various touch regions determined to grooves may be eliminated from a further analysis to determine the XY coordinates of actual touch inputs.

18 Claims, 4 Drawing Sheets

| 5  | 10  | 15 | 10  | 5  |
|----|-----|----|-----|----|
| 30 | 50  | 40 | 40  | 20 |
| 50 | 100 | 92 | 120 | 40 |
| 30 | 80  | 60 | 70  | 30 |
| 10 | 55  | 60 | 40  | 20 |
| 15 | 50  | 90 | 50  | 10 |
| 5  | 30  | 50 | 30  | 10 |

*FIG. 4A*

| 0 | 0  | 0  | 0  | 0  |
|---|----|----|----|----|
| 0 | 0  | 0  | 0  | 0  |
| 0 | 50 | 42 | 70 | 40 |
| 0 | 30 | 10 | 20 | 0  |
| 0 | 5  | 10 | 0  | 0  |
| 0 | 0  | 40 | 0  | 0  |
| 0 | 0  | 0  | 0  | 0  |

*FIG. 4B*

| 0 | 0  | 0  | 0  | 0 |
|---|----|----|----|---|
| 0 | 0  | 0  | 0  | 0 |
| 0 | 20 | 12 | 40 | 0 |
| 0 | 0  | 0  | 0  | 0 |
| 0 | 0  | 0  | 0  | 0 |
| 0 | 0  | 10 | 0  | 0 |
| 0 | 0  | 0  | 0  | 0 |

*FIG. 4C*

| 0 | 0 | 0 | 0  | 0 |
|---|---|---|----|---|
| 0 | 0 | 0 | 0  | 0 |
| 0 | 5 | 0 | 25 | 0 |
| 0 | 0 | 0 | 0  | 0 |
| 0 | 0 | 0 | 0  | 0 |
| 0 | 0 | 0 | 0  | 0 |
| 0 | 0 | 0 | 0  | 0 |

*FIG. 4D*

| 5  | 10  | 15  | 10  | 5  |
|----|-----|-----|-----|----|
| 30 | 50  | 30  | 40  | 20 |
| 50 | 100 | 80  | 120 | 40 |
| 30 | 70  | 50  | 80  | 30 |
| 10 | 55  | 90  | 40  | 20 |
| 15 | 80  | 130 | 60  | 10 |
| 5  | 30  | 50  | 30  | 10 |

*FIG. 5A*

| 0 | 0 | 0 | 0 | 0 |
|---|---|---|---|---|
| 0 | 1 | 0 | 1 | 0 |
| 1 | 1 | 1 | 1 | 1 |
| 0 | 1 | 1 | 1 | 0 |
| 0 | 1 | 1 | 1 | 0 |
| 0 | 1 | 1 | 1 | 0 |
| 0 | 0 | 1 | 0 | 0 |

*FIG. 5B*

| 5  | 10  | 15  | 10  | 5  |
|----|-----|-----|-----|----|
| 30 | 50  | 30  | 40  | 20 |
| 50 | 100 | 80 | 120 | 40 |
| 30 | 70  | *50* | 80  | 30 |
| 10 | 55  | 90 | 40  | 20 |
| 15 | 80  | 130 | 60  | 10 |
| 5  | 30  | 50  | 30  | 10 |

FIG. 6A

| 5  | 10  | 15  | 10  | 5  |
|----|-----|-----|-----|----|
| 30 | 50  | 30  | 40  | 20 |
| 50 | 100 | 80  | 120 | 40 |
| 30 | 70 | *50* | 80 | 30 |
| 10 | 55  | 90  | 40  | 20 |
| 15 | 80  | 130 | 60  | 10 |
| 5  | 30  | 50  | 30  | 10 |

FIG. 6B

| 5  | 10  | 15  | 10  | 5  |
|----|-----|-----|-----|----|
| 30 | 50  | 30  | 40  | 20 |
| 50 | 100 | 80 | 120 | 40 |
| 30 | 70  | *50* | 80 | 30 |
| 10 | 55  | 90  | 40 | 20 |
| 15 | 80  | 130 | 60  | 10 |
| 5  | 30  | 50  | 30  | 10 |

FIG. 6C

| 5  | 10  | 15  | 10  | 5  |
|----|-----|-----|-----|----|
| 30 | 50  | 30  | 40  | 20 |
| 50 | 100 | 80  | 120 | 40 |
| 30 | 70  | *50* | 80 | 30 |
| 10 | 55 | 90 | 40  | 20 |
| 15 | 80  | 130 | 60  | 10 |
| 5  | 30  | 50  | 30  | 10 |

FIG. 6D

| 5  | 10  | 15  | 10  | 5  |
|----|-----|-----|-----|----|
| 30 | 50  | 30 | 40 | 20 |
| 50 | 100 | 80  | 120 | 40 |
| 30 | 70  | *50* | 80 | 30 |
| 10 | 55  | 90 | 40 | 20 |
| 15 | 80  | 130 | 60  | 10 |
| 5  | 30  | 50  | 30  | 10 |

FIG. 6E

| 5  | 10  | 15  | 10  | 5  |
|----|-----|-----|-----|----|
| 30 | 50  | 30  | 40  | 20 |
| 50 | 100 | 80 | 120 | 40 |
| 30 | 70  | *50* | 80 | 30 |
| 10 | 55  | 90  | 40  | 20 |
| 15 | 80  | 130 | 60 | 10 |
| 5  | 30  | 50  | 30  | 10 |

FIG. 6F

| 5  | 10  | 15  | 10  | 5  |
|----|-----|-----|-----|----|
| 30 | 50  | 30  | 40  | 20 |
| 50 | 100 | 80  | 120 | 40 |
| 30 | 70 | *50* | 80 | 30 |
| 10 | 55  | 90  | 40  | 20 |
| 15 | 80  | 130 | 60  | 10 |
| 5  | 30  | 50  | 30  | 10 |

FIG. 6G

| 5  | 10  | 15  | 10  | 5  |
|----|-----|-----|-----|----|
| 30 | 50  | 30  | 40  | 20 |
| 50 | 100 | 80  | 120 | 40 |
| 30 | 70 | *50* | 80 | 30 |
| 10 | 55  | 90  | 40  | 20 |
| 15 | 80  | 130 | 60  | 10 |
| 5  | 30  | 50  | 30  | 10 |

FIG. 6H

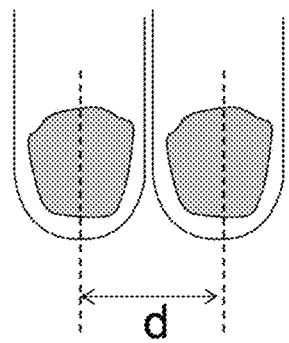
FIG. 7A  FIG. 7B  FIG. 7C
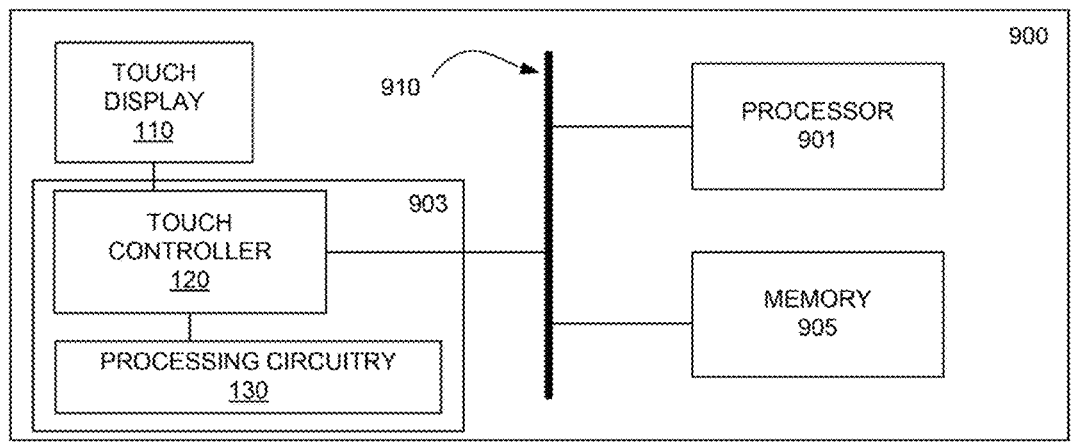
FIG. 8
FIG. 9

DETERMINING FINGER SEPARATION THROUGH GROOVE ANALYSIS IN A TOUCH SCREEN DEVICE

BACKGROUND

Touch screens are prevalent in today's computing environment. Portable computers, desktop computers, hand-held computers, and smart phones employ use of a touch screen to gain user input for navigation and control of these devices. Thus, discerning the intent of the user via touch inputs becomes an important feature of any touch screen device. Further, distinguishing actual touches to the touch screen by the user from noise and other non-input detections is also important for delivering a meaningful manner of the user communicating intent through touches to the touch screen.

Typically, an input to a touch screen (e.g., touch, hereinafter) is intended by the user by placing a finger or stylus on the screen causing the touch screen to generate a variety of signals to as to identify the location of the touch on the touch screen. Further, sometimes two or more touches are intended simultaneously so as to convey the intent for a specific navigation command, such as zoom within an application that is currently running or to close the application altogether. Thus, deciphering, via a dedicated touch screen algorithm, the intent of the user when simultaneous touches are received is an important feature of any touch screen device. But as alluded to above, noise and other factors complicate the deciphering.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

FIGS. 4A-4D are a series of data frames of touch strength signals detected at each touch region of a touch screen display for a typical multiple-touch scenario that undergoes a water-shed algorithm for deciphering the touch inputs.

FIGS. 5A-5B are a data frame and a corresponding touch map of touch strength signals detected at each touch region of the touch screen display for a typical multiple-touch scenario that undergoes a groove-analysis algorithm for deciphering the touch inputs according to an embodiment.

FIGS. 6A-6H are a series of marked-up data frames illustrating the steps of a groove analysis algorithm applied to the data frame of touch strength signals detected at each designated area of the touch screen display according to an embodiment.

FIGS. 7A-7C are a series of a data frame and corresponding touch maps showing updates after groove analysis according to an embodiment.

FIG. 8 is diagram of two fingers of a user to illustrate a minimum reality check used during a final step of the groove analysis algorithm illustrated with respect to FIGS. 5-7 according to an embodiment.

FIG. 9 is a block diagram of a system suitable for using the groove-analysis algorithm of FIG. 5-8 according to an embodiment.

DETAILED DESCRIPTION

Figures 1, 2, 3:
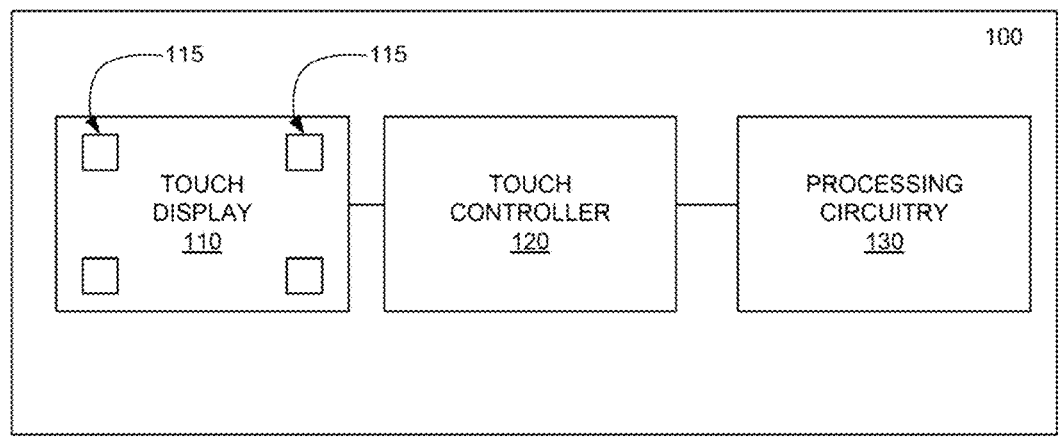
FIG. 1 is a block diagram of a touch screen device according to an embodiment as disclosed herein.
FIG. 2 is a data frame of touch signal strengths detected at each touch region of the touch screen display for a typical single-touch scenario according to an embodiment.
FIG. 3 is a data frame of touch strength signals detected at each designated area of the touch screen display for a typical multiple-touch scenario according to an embodiment.

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

By way of overview, the subject matter disclosed herein is related to a touch screen device having a tactile input surface suited to detect more than one tactile input (e.g., finger touch) at a time. To further distinguish between two different tactile inputs, (e.g., finger separation) the touch screen device may include a touch screen controller that includes an analysis circuit for determining grooves between touch inputs. Generally speaking, when a touch input is received at the surface of a touch screen device, the touch screen may register touch strength signals at each of a plurality of touch regions. The touch strength signals will be largest at the epicenter of the actual touch inputs and will fall off in adjacent touch regions therefrom. By analyzing the touch strength signals at every touch region relative to touch signal strengths at touch regions adjacent to the touch region under analysis, the touch screen controller may be able to eliminate touch regions that are determined to be grooves. A groove may be generally defined as a touch region that exhibits a touch strength signal that is less than surrounding touch regions.

Once all touch regions are analyzed by a groove analysis, various touch regions determined to be grooves may be eliminated from a further analysis to determine the XY coordinates of actual touch inputs. The exclusion of grooves leads to a more robust and efficient determination of the actual touch inputs and reduces the possibility of false positives or actual touch inputs being missed by other types of touch input signal analysis. These and other aspects of the embodiments described herein are discussed in greater detail with respect to FIGS. 1-9.

FIG. 1 is a functional block diagram of a touch screen device 100 according to an embodiment as disclosed herein. The touch screen device 100 includes a tactile input surface, such as a touch display 110 coupled to a touch controller 120. The touch screen display 110 is designed to receive touch inputs from a user through a user's fingers or a stylus (not shown) being operated by a user. The touch screen display 110 may also include one or more touch screen sensors 115 that are configured to detect one or more touches (or other input actions such as hover or gesture motions) to the touch screen display 110. As a touch is sensed, the touch screen controller 120 may receive one or more touch screen signals from the sensors 115 and analyze the signal(s) as a specific touch (or multiple touches) on the touch screen display 110. This interpretation may then be used by processing circuitry 130 (such as a processor or applications running in memory (not shown)) to manipulate operations respect to applications and programs executing on the touch screen device 100.

In one embodiment, the sensors 115 may all be a single type of sensing technology or sensor, such as capacitive sensors, to be utilized in the touch screen device 100 to detect input events. Other types of sensors are possible including optical recognition sensors, vibrations analysis sensors, resistive sensors, ultrasonic sensors, and the like. In other embodiments, one or more sensors 115 may also be a motion sensor such as microelectromechanical systems (MEMS) accelerometer, which is typically already contained in many electronic devices, such as smart phones.

In operation of the touch screen device 100, a user may generate one or more touch points through touching or nearly touching the touch screen display 110, such as a touch event, hover event, or gesture event, which were previously described above. Briefly, a touch event is an interface input where the user's finger is actually touching the surface of the touch screen display 110 while in hover and gesture events, the user's finger is within a sensing range above the surface of the touch screen display 110 but is not touching the surface. Further, in a hover event the finger is stationary or moving while in a gesture event the finger is moving in a singular or plural predefined constrains.

In response to a touch or gesture event, the sensors 115 generate respective signals that are provided to the touch screen controller 120 which, in turn, processes these signals to generate touch information for one or more corresponding touch points. The touch information that the touch screen controller 120 generates for each touch point includes location information and event information identifying the type of interface input, namely whether the touch point corresponds to a touch event, hover event, gesture event, or some other type of event recognized by the touch screen controller 120. The location information may include an X-coordinate and a Y-coordinate that together define the XY location of the touch point on the surface of the touch screen display 110.

In an embodiment where the sensors 115 are capacitive sensors, the sensors 115 are typically formed as an array of sensors from transparent patterned orthogonal conductive lines (not shown) formed on the surface, or integrated as part of, the touch display 110. The intersections of the conductive lines form individual sensors or "sensing points," and the touch screen controller 120 scans these sensing points and processes the generated signals to identify the location and type of touch point or points. Thus, one may think of the touch screen display 110 as a touch map having XY coordinates wherein several touch regions (as defined by a set of XY coordinates) of possible touch information may be generated based on one or more touches to the touch screen display 110. That is, each XY coordinate in the touch screen display 110 may have at least some touch strength signal generated at each touch with larger touch strength signals being generated closer to the source of the touch input. Depending on the strength of the detected strength signal, the touch screen controller 120 may then determine one or more epicenters of touches. Such a range of signals is illustrated with respect to FIGS. 2 and 3 as described below.

FIG. 2 is a data frame 200 of touch signal strengths detected at each touch region of the touch screen display 110 for a typical single-touch scenario according to an embodiment. As shown in this data frame 200, there are, for the sake of simple illustration, five columns (e.g., X-coordinate) and five rows (e.g., Y-coordinate) of touch regions. Of course, a skilled artisan understands that the number of rows and columns may be quite large to have a higher granularity of signal differentiation in a touch screen display 110. When a touch to the touch screen display 110 occurs (for the remainder of this disclosure, only the touch scenario will be discussed as hover and gesture inputs may be handled similarly), each touch region may have a touch strength signal generated therein such that each touch region includes a corresponding touch strength signal ranging from highest (at the epicenter of the touch) to lowest (regions furthest from the epicenter).

Thus, one can see here that the highest touch strength signal is 130 at the very center of the data frame. This touch region is surrounded by touch regions ranging from 70 to 80 and, in turn, the next regions are lower ranging from 10-45. At the furthest touch regions at the very corners of the data frame, no touch strength signal is generated as this is too far from the epicenter touch region registering a touch signal strength of 130. This data frame is an illustration of a single touch (at the center touch region showing a touch strength signal of 130). Such a single touch is able to be discerned through conventional analysis methods by the touch screen controller 120. However, as multiple touches are detected, the touch strength signals begin to show multiple epicenters that may be more difficult to isolate and discern such as that which is shown in FIG. 3.

FIG. 3 is a data frame of touch strength signals detected at each designated area of the touch screen display 110 for a typical multiple-touch scenario according to an embodiment. As can be seen the relative values of the touch strength signals at the various touch regions of the data frame show that there are three touch regions having a touch strength signal of 100 or larger. A simple peak recognition algorithm may then determine that these three regions (corresponding to the touch strength signals 100, 120 and 130 of the data frame) exceed a given threshold (e.g., 100) so as to indicate touches at each of these touch regions.

However, due to real world factors and influences on the touch strength signals, noise and constructive signal interference may lead to one or more touch regions showing a touch strength signal that exceeds a peak recognition threshold when, in fact, no actual touch input was initiated at such touch region. This may result in a false positive wherein a touch input is detected at a touch region without actually receiving a touch input. Therefore, additional analysis of the touch strength signals in the data frame may be accomplished in order to more accurately identify actual touches to the touch screen display 110 when multiple touch inputs are occurring.

One calculation-intensive solution involves using an image-recognition algorithm to identify fingertips, and the like, in order to further distinguish between an actual touch input and false positives. Of course, such complicated image recognition algorithms are calculation intensive and may overwhelm devices that are limited in computing power due to the nature of the device (e.g., palm-top computer or smartphone). Thus, a more efficient approach may be to analyze the relative touch strength signals at each touch region of the data frame with respect to one another. FIGS. 4-8 illustrate various algorithms for a multi-touch touch screen controller 120 in conjunction with the remainder of this disclosure.

FIGS. 4A-4D are a series of data frames of touch strength signals detected at each touch region of a touch screen display for a typical multiple-touch scenario that undergoes a water-shed algorithm for deciphering the touch inputs. The so-called water-shed algorithm uses an analogy to a body of water at the surface of the touch screen display 110 that may exhibit wave ripples with epicenters at each actual touch input. The water-shed algorithm is based upon a concept that when water volume is rising (e.g., peak of a wave), then only the peaks of the waves are visible from a perspective close to the surface.

To further illustrate a watershed algorithm, consider the data frame of FIG. 4A having a spread of touch strength signals ranging from 5 to 120. In this example, the actual touch inputs shall be the three touch regions having touch strength signal values of 120, 100 and 90, respectively. To be effective, an algorithm should accurately determine these three touch regions to correspond to actual touch inputs. Thus, by using a first minimum threshold value (in this example, 50) by which any actual touch strength signal values are at least as high as, the minimum threshold value may be subtracted from each touch region in the data frame. If the minimum threshold value subtracted from any one touch region leaves the resulting touch strength signals value negative, it is simply zeroed out. This leads to an updated data frame with updated touch strength signal values in the data frame of FIG. 4B.

At this first pass, the algorithm may determine that the spread of touch regions that still have a value does not yield a multi-touch pattern that is recognizable. Thus, a second iteration of the process may ensue. At next pass, the minimum threshold value may be set lower, for example to 30, wherein each remaining touch region still having a touch strength signal value has 30 subtracted therefrom. This results in the data frame of FIG. 4C which leaves only four touch regions with a touch strength signal value. If the algorithm determines that this level of analysis is enough, then a false positive will be identified at the touch region corresponding to the touch strength signal of 12. However, having three touch regions in a row may not be realistic, so the watershed algorithm may proceed to yet another iteration.

In the final iteration in this example, a third minimum threshold value of 15 may used. As before, each touch region having a remaining touch strength signal value then has 15 subtracted therefrom. The final result here is the data frame of FIG. 4D. Wherein only two touch regions remain with a touch strength signal value. Thus, the algorithm may correctly conclude that each of the two remaining touch regions in the data frame of FIG. 4D corresponds to an actual touch input, but the algorithm does not correctly identify the third touch input at the touch region below the first two (i.e., the touch region having a touch strength signal of 10 in the data frame of FIG. 4C).

Thus, the watershed algorithm may not work well when two touch inputs are very close to each other as is the case with the initial signal strengths of 100 and 120 in the touch map of FIG. 4A. This is because the touch region between these two shows a touch strength signal of 92 which is almost as high as the second touch strength signal of 100 and higher than the third touch strength signal of 90. This problem is exacerbated over larger touch screen areas. As a result, the watershed algorithm has been shown to yield incorrect results in this example. A more accurate groove analysis algorithm is described next with respect to FIG. 5-8 below.

FIGS. 5A-5B are a data frame and a corresponding touch map of touch strength signals detected at each touch region of the touch screen display for a typical multiple-touch scenario that undergoes a groove-analysis algorithm for deciphering the touch inputs according to an embodiment. In a groove-analysis algorithm, the focus of the analysis shifts away from the actual peak touch regions to the regions between the peaks, e.g., the grooves or valleys. Thus, instead of analyzing the touch regions that are the epicenters of potential touch inputs, the actual touch regions may be identified by an analysis of the touch regions surrounding and/or between the actual touch regions corresponding to the touch inputs. The following paragraphs are an example embodiment showing an initial data frame and touch map having three actual touch inputs.

In FIG. 5A, an initial data frame is shown having a spread of touch strength signals detected at each touch region. Again, only a five-by-five matrix of touch regions is shown here for the ease of illustration as a skilled artisan understand that an actual data frame (and corresponding touch screen display) may be much larger. In this example, three touch regions receive an actual touch input, the touch regions corresponding to the touch strength signals of 100, 120, and 130. Thus, the goal of the groove analysis algorithm is to correctly identify these touch regions as receiving respective touch inputs but not identify any other touch region as a touch input.

At first pass, a threshold signal strength is used to change the data frame of FIG. 5A into the touch map of FIG. 5B which is a binary digital representation of the touch strength signals in the data frame of FIG. 5A. That is, any individual touch region having a signal strength that is at or above a minimum signal strength threshold (in this example, 35), is then assigned a value of 1 in the touch map of FIG. 5B. Similarly, any touch region that is below the minimum signal strength threshold is the assigned a value of 0. The resulting touch map is then shown in FIG. 5B.

If this grouping of logic 1 values in corresponding touch regions is smaller than a minimum number of touch regions (for example four touch regions), the algorithm may determine that this indicates a single touch input with which to begin. However, if more than a minimum threshold of touch regions in the touch map of FIG. 5B are associated with the logic one value, then the algorithm may proceed to groove analysis to determine corresponding touch regions amongst two or more touch inputs. Thus, through groove analysis, the touch map of FIG. 5B may then be updated as described next by performing a groove analysis algorithm on each data frame touch region exhibiting a touch strength signal that meets or exceeds the minimum signal strength threshold (e.g., any touch region in the touch map of FIG. 5B having a 1).

FIGS. 6A-6H are a series of marked-up data frames illustrating the steps of a groove analysis algorithm applied to the data frame of touch strength signals detected at each designated area of the touch screen display according to an embodiment. After the minimum threshold analysis, as described above, deciphers each touch region that registers a touch strength signal above the minimum signal strength threshold, each touch region in each data frame is then analyzed in eight different orientations to determine if the particular touch region is a groove with respect to other touch strength signals of other respective touch regions surrounding the touch region under analysis. In simple terms, a groove may be identified as a touch region having a touch strength signal that is lower than touch strength signal of touch regions on opposite sides of the analyzed touch region. That is, if a lower touch strength signal is between two higher touch strength signal, then the touch region that registers the lower touch strength signal may be designated as a groove. Each of these eight algorithm analyses are discussed below in FIGS. 6A-6H with respect to only one touch region for ease of illustration—the touch region in the center of the data frame having a touch strength signal of 50.

The first data frame analysis in FIG. 6A analyzes immediately adjacent touch regions in the vertical direction. Here, the center touch region having a touch strength signal of 50 is flanked by a touch region to the top having a touch strength signal of 80 and touch strength signal in the touch region immediately below of 90. Because the touch strength signal of 50 is below both 80 and 90, this vertical analysis determines that the analyzed touch region is a groove. How the algorithm handles this determination is discussed below with respect to FIGS. 7A-C, but for now the remaining directional analyses are discussed.

The second data frame analysis in FIG. 6B analyzes immediately adjacent touch regions in the horizontal direction. Here, the center touch region having a touch strength signal of 50 is flanked by a touch region to the left having a touch strength signal of 70 and touch strength signal in the touch region immediately to the right of 80. Because the touch strength signal 50 is below both 70 and 80, this horizontal analysis determines that the analyzed touch region is a groove.

The third data frame analysis in FIG. 6C analyzes immediately adjacent touch regions in first diagonal direction. Here, the center touch region having a touch strength signal of 50 is flanked by a touch region to the upper left having a touch strength signal of 100 and touch strength signal in the touch region immediately to the lower right of 40. Because the touch strength signal 50 is below 100 but not below 40, this second diagonal direction analysis determines that the analyzed touch region is not a groove.

The fourth data frame analysis in FIG. 6D analyzes immediately adjacent touch regions in second diagonal direction. Here, the center touch region having a touch strength signal of 50 is flanked by a touch region to the lower left having a touch strength signal of 55 and touch strength signal in the touch region immediately to the upper right of 120. Because the touch strength signal 50 is below both 55 and 120, this first diagonal direction analysis determines that the analyzed touch region is a groove.

The fifth data frame analysis in FIG. 6E analyzes a secondary relationship having one immediately adjacent touch region below and a touch region that is two regions away above the center analyzed region. Here, the center touch region having a touch strength signal of 50 is flanked by a touch region below having a touch strength signal of 90 and touch strength signal in the touch region immediately that is two regions above the center region of 30. Because the touch strength signal 50 is below 90 but not below 30, this first secondary relationship analysis determines that the analyzed touch region is not a groove.

The sixth data frame analysis in FIG. 6F analyzes one immediately adjacent touch region above and a touch region that is two regions away below the center analyzed region. Here, the center touch region having a touch strength signal of 50 is flanked by a touch region above having a touch strength signal of 80 and touch strength signal in the touch region that is two regions below the center region of 130. Because the touch strength signal 50 is below both 80 and 130, this secondary direction analysis determines that the analyzed touch region is a groove.

The seventh data frame analysis in FIG. 6G analyzes another secondary relationship having one immediately adjacent touch region to the left and a touch region that is two regions away to the right of the center analyzed region. Here, the center touch region having a touch strength signal of 50 is flanked by a touch region to the left having a touch strength signal of 70 and touch strength signal in the touch region that is two regions to the right of the center region of 30. Because the touch strength signal 50 is below 70 but not below 30, this secondary relationship analysis determines that the analyzed touch region is not a groove.

The eighth data frame analysis in FIG. 6H analyzes yet another secondary relationship having one immediately adjacent touch region to the right and a touch region that is two regions away to the left of the center analyzed region. Here, the center touch region having a touch strength signal of 50 is flanked by a touch region to the right having a touch strength signal of 80 and touch strength signal in the touch region that is two regions to the left of the center region of 30. Because the touch strength signal 50 is below 80 but not below 30, this secondary relationship analysis determines that the analyzed touch region is not a groove.

The collective results of each of these eight analysis may be further analyzed to determine a groove presence or lack thereof. In one embodiment, if any single one of the eight criteria described above with respect to FIGS. 6A-6H, the touch region under focus may then be determined to be a groove. Once indicated as a groove, the associated logic value in the corresponding touch map (such as in FIG. 5B) may be changed from a logic 1 to a logic 0 to reflect this determination. Such further changing of the touch map is discussed further below with respect to FIGS. 7A-7C.

In one embodiment, in order to compensate for noise, a small adjustment to each touch region under analysis may be made such that the touch strength signal is slightly augmented up in order to eliminate false positives when rather small differences may exists between adjacent touch regions. In one embodiment, the augmentation is 10% of the touch strength signal of the current touch region under analysis.

Other embodiments may be directed to determining a groove based on a different analysis of the results of the analyses of FIGS. 6A-6H. For example, a groove may be determined if any two the eight criteria of FIGS. 6A-6H are met. In other embodiments, four or all eight if the criteria of FIGS. 6A-6H being met may result in a groove determination. In still further embodiments, various combinations of the criteria from FIGS. 6A-6H being met may result in positive groove determination, such as, if any one of the criteria of FIGS. 6A-6D or any two of the criteria from FIGS. 6E-6H. Once a particular touch region is determined to be a groove through this groove analysis, the corresponding touch map may be updated accordingly as discussed next with respect to FIGS. 7A-7C.

FIGS. 7A-7C are a series of a data frame and corresponding touch maps showing updates after groove analysis according to an embodiment. After groove analysis as described above (using the embodiment wherein if a touch region meets any one of the criteria from FIGS. 6A-6H), FIG. 7A shows four touch regions (shown as shaded) that meet at least one criteria from the groove analysis. Thus, the corresponding region in the touch map of FIG. 7B is then changed from a logic 1 to a logic 0. Recall from the discussion regarding FIG. 5B that the initial logic values represent any touch region that simply exceeds a minimum signal strength threshold. Thus, the touch regions that are shaded may have touch strength signal of 80, 55, 50 and 40 which do exceed a minimum threshold of 35, but also meet at least one of the criteria of the analyses of FIGS. 6A-6H. The initial logic 1 in these shaded touch regions is changed to logic 0.

Once the touch map as shown in FIG. 7B is fully updated, a more easily recognized pattern begins to emerge showing three distinct touch inputs encompassing more than one touch region per touch input. This is shown more clearly in FIG. 7C wherein touch inputs A, B. and C are identified. An additional analysis may be performed on the touch map of FIG. 7B to identify the touch inputs A, B. and C and shown in FIG. 7C. In one embodiment, a touch input may defined by a combination of touch regions wherein any two touch regions having a logic 1 that are adjacent to each other in a vertical or horizontal direction are considered to be part of the same touch input. Further, any diagonally adjacent touch regions having a logic 1 in the touch map of FIG. 7B without also having another vertically or horizontally adjacent logic 1 touch region is not considered to be part of the same touch region. This analysis results of the grouping of the touch regions into the touch inputs A, B. and C as shown in FIG. 7C. Other grouping algorithms are contemplated but not discussed herein for brevity.

Based on the grouping of logic 1 values in the final touch map of FIG. 7C, the actual XY coordinates of each touch input is calculated by a centroid algorithm or other commonly used touch coordinate determination algorithm. But as shown and discussed with respect to FIG. 8 below, a final "reality check" may be performed on the calculated XY coordinates of the touch inputs that result from groove analysis.

FIG. 8 is diagram of two fingers of a user to illustrate a minimum reality check used during a final step of the groove analysis algorithm illustrated with respect to FIGS. 5-7 according to an embodiment. A typical user will have a minimum distance d between two fingers at about 10 mm. Thus, this final check in the overall groove analysis algorithm will determine if the actual calculated distance between touch inputs at least exceeds a minimum distance threshold such as distance d. If two identified touch inputs do not exceed this minimum distance threshold d, then the two touch inputs are merged into a single touch input. Hence, if there are more than one touch input determined as a result of groove analysis but with distance less than d, it is most probably false separation and should be merged.

FIG. 9 is a block diagram of a system 900 suitable for using the groove-analysis algorithm of FIG. 5-8 according to an embodiment. The system 900 may be a touch screen device such as a laptop or palm top computer. It may be further be a desktop system or smartphone or any other device suited to use a tactile input surface for data input. The system 900 includes a touch display 110 coupled to a touch controller 120. The touch controller 120 may be a single integrated circuit chip 903 that also includes processing circuitry 130 or may be multiple integrated circuit chips with various functionality spread across the multiple chips. The touch screen display 110 is designed to receive touch inputs from a user through a user's fingers or a stylus (not shown) being operated by a user. As a touch is sensed, the touch screen controller 120 may receive one or more touch screen signals and interpret the signal(s) as a specific touch (or multiple touches) on the touch screen display 110. This interpretation may then be used by processing circuitry 130 to manipulate operations with respect to applications and programs executing on the system 900. Further, the touch screen controller 120 may be coupled to a system bus 910 which is, in turn coupled to a device processor 901 and a device memory 905 that are able to coordinate the overall operation of the system 900 and various application executing thereon.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A device, comprising:
a tactile input surface having a plurality of touch regions, and comprising a plurality of touch sensors configured to generate a touch signal corresponding to a touch input at each of the plurality of touch regions;
an analyzer configured to receive the touch signal from each touch region and configured to determine whether to perform groove analysis based upon determining that more than a given number of the touch regions have touch signals exceeding a minimal strength threshold;
wherein the analyzer, if the groove analysis is to be performed, performs the groove analysis for the touch regions having touch signals exceeding the minimal strength threshold by analyzing the touch signals exceeding the minimal strength threshold to determine at least one groove, the analyzer further configured to determine a difference between a first touch and a second touch based on the determination of the at least one groove;
wherein the analyzer is configured to determine a touch input at a given touch region to be a groove based on the given touch region having a touch signal indicating contact between a user's finger and a touch sensor of the plurality thereof, but being lesser in strength than touch signals from surrounding touch regions;
wherein the analyzer is configured to set the touch input at the given touch region to zero in response to determining that touch input to be a groove, to thereby indicate that the touch input is a groove; and
wherein the analyzer, if the groove analysis is not to be performed, determines the touch input at the given touch region to represent a single touch.

2. The device of claim 1 wherein the tactile input surface comprises a touch screen display and the analyzer comprises a touch screen controller.

3. The device of claim 1, wherein the analyzer is further configured to determine the touch input at a touch region to be a groove based on meeting at least one of the following criteria:
a first touch region has a touch signal that is less than a touch signal of a second touch region to the immediate left of the first touch region and less than the touch signal of a third touch region to the immediate right of the first touch region;
a first touch region has a touch signal that is less than a touch signal of a second touch region that is immediately above the first touch region and less than the touch signal of a third touch region that is immediately below the first touch region;
a first touch region has a touch signal that is less than a touch signal of a second touch region to the immediate upper left of the first touch region and less than the touch signal of a third touch region to the immediate lower right of the first touch region;
a first touch region has a touch signal that is less than a touch signal of a second touch region to the immediate lower left of the first touch region and less than the touch signal of a third touch region to the immediate upper right of the first touch region;
a first touch region has a touch signal that is less than a touch signal of a second touch region to the immediate left of the first touch region and less than the touch signal of a third touch region to the right of but not adjacent to the first touch region;
a first touch region has a touch signal that is less than a touch signal of a second touch region to the immediate right of the first touch region and less than the touch signal of a third touch region to the left of but not adjacent to the first touch region;
a first touch region has a touch signal that is less than a touch signal of a second touch region to the immediately above of the first touch region and less than the touch signal of a third touch region below but not adjacent to the first touch region; and
a first touch region has a touch signal that is less than a touch signal of a second touch region to the immediately below the first touch region and less than the touch signal of a third touch region above but not adjacent to the first touch region.

4. The device of claim 1, wherein the analyzer is further configured to determine the touch input at a touch region to be a groove based on meeting at least two of the following criteria:
a first touch region has a touch signal that is less than a touch signal of a second touch region to the immediate left of the first touch region and less than the touch signal of a third touch region to the immediate right of the first touch region;
a first touch region has a touch signal that is less than a touch signal of a fourth touch region that is immediately above the first touch region and less than the touch signal of a fifth touch region that is immediately below the first touch region;
a first touch region has a touch signal that is less than a touch signal of a sixth touch region to the immediate upper left of the first touch region and less than the touch signal of a seventh touch region to the immediate lower right of the first touch region;
a first touch region has a touch signal that is less than a touch signal of an eighth touch region to the immediate lower left of the first touch region and less than the touch signal of a ninth touch region to the immediate upper right of the first touch region;
a first touch region has a touch signal that is less than a touch signal of a tenth touch region to the immediate left of the first touch region and less than the touch signal of an eleventh touch region to the right of but not adjacent to the first touch region;
a first touch region has a touch signal that is less than a touch signal of a twelfth touch region to the immediate right of the first touch region and less than the touch signal of a thirteenth touch region to the left of but not adjacent to the first touch region;
a first touch region has a touch signal that is less than a touch signal of a fourteenth touch region to the immediately above of the first touch region and less than the touch signal of a fifteenth touch region below but not adjacent to the first touch region; and
a first touch region has a touch signal that is less than a touch signal of a sixteenth touch region to the immediately below the first touch region and less than the touch signal of a seventeenth touch region above but not adjacent to the first touch region.

5. The device of claim 1, wherein the analyzer is further configured to determine the touch input at a touch region to be a groove based on meeting at least one of the following criteria:
a first touch region has a touch signal that is less than a touch signal of a second touch region to the immediate left of the first touch region and less than the touch signal of a third touch region to the immediate right of the first touch region;
a first touch region has a touch signal that is less than a touch signal of a second touch region that is immediately above the first touch region and less than the touch signal of a third touch region that is immediately below the first touch region;
a first touch region has a touch signal that is less than a touch signal of a second touch region to the immediate upper left of the first touch region and less than the touch signal of a third touch region to the immediate lower right of the first touch region;
a first touch region has a touch signal that is less than a touch signal of a second touch region to the immediate lower left of the first touch region and less than the touch signal of a third touch region to the immediate upper right of the first touch region;
or meeting at least two of the following criteria:
a first touch region has a touch signal that is less than a touch signal of a second touch region to the immediate left of the first touch region and less than the touch signal of a third touch region to the right of but not adjacent to the first touch region;
a first touch region has a touch signal that is less than a touch signal of a second touch region to the immediate right of the first touch region and less than the touch signal of a third touch region to the left of but not adjacent to the first touch region;
a first touch region has a touch signal that is less than a touch signal of a second touch region to the immediately above of the first touch region and less than the touch signal of a third touch region below but not adjacent to the first touch region; and
a first touch region has a touch signal that is less than a touch signal of a second touch region to the immediately below the first touch region and less than the touch signal of a third touch region above but not adjacent to the first touch region.

6. The device of claim 1, wherein the analyzer is further configured to:
determine that a first touch region identified as corresponding to a first touch input and a second touch region identified as corresponding to a second touch input are within a minimum distance of each other, the distance corresponding to a distance between two fingers of a user; and
merge the first touch input with the second touch input based on the first touch region and the second touch region being within the minimum distance.

7. The device of claim 1 wherein the tactile input surface comprises a plurality of capacitive sensors configured to generate touch signals based on a capacitance measured at each of the plurality of touch regions.

8. An integrated circuit, comprising:
an input for receiving touch signals corresponding to at least one first touch input and at least one second touch input, the touch signals received from a tactile input surface having a plurality of touch regions; and
an analyzer configured to determine whether to perform groove analysis based upon determining that more than a given number of the touch regions have touch signals exceeding a minimal strength threshold, the groove analysis for distinguishing a first touch input from a second touch input based on an analysis of determined grooves;

wherein the tactile input surface comprises a plurality of touch sensors configured to generate a touch strength signal corresponding to a touch input at each of the plurality of touch regions;

wherein the analyzer, if the groove analysis is to be performed, is configured to determine the touch input at a given touch region to be a groove based on the given touch region having a touch signal exceeding a minimal strength threshold to thereby indicate actual contact between a user's finger and a touch sensor of the plurality thereof, but being lesser in strength than touch signals from surrounding touch regions;

wherein the analyzer is configured to set the touch input at the given touch region to zero in response to determining that touch input to be a groove, to thereby indicate that the touch input is a groove;

wherein the analyzer, if the groove analysis is not to be performed, determines the touch input at the given touch region to represent a single touch.

9. The integrated circuit of claim 8, further comprising a single integrated circuit die.

10. The integrated circuit of claim 8, further comprising multiple integrated circuit dies.

11. A system, comprising:
a touch screen;
a touch screen controller coupled to the touch screen, the touch screen controller including:
an input for receiving touch signals corresponding to at least one first touch input and at least one second touch input, the touch signals received from a tactile input surface of the touch screen having a plurality of touch regions; and
wherein the tactile input surface comprises a plurality of touch sensors configured to generate the touch signal corresponding to a touch input at each of the plurality of touch regions;
an analyzer configured to determine whether groove analysis is to be performed based upon determining that more than a given number of touch regions have touch signals exceeding a minimal strength threshold, the groove analysis for distinguishing a first touch input from a second touch input based on an analysis of determined grooves;
wherein the analyzer, if the groove analysis is to be performed, is configured to determine a touch input for a given touch region to be a groove based on the given touch region having a touch signal exceeding a minimal strength threshold to thereby indicate actual contact between a user's finger and a touch sensor of the plurality thereof, but being lesser in strength than touch signals from surrounding touch regions;
wherein the analyzer is configured to set the touch input at the given touch region to zero in response to determining that touch input to be a groove, to thereby indicate that the touch input is a groove;
wherein the analyzer, if the groove analysis is not to be performed, is configured to determine the touch input for the given touch region to be a single touch; and
a processor coupled to the touch screen controller and configured to interpret input signals received by the touch screen controller.

12. A method, comprising:
receiving a plurality of tactile inputs at a tactile input device;
determining a touch signal at each of a plurality of touch regions in the tactile input device;
determining whether to perform groove analysis based upon determining that more than a given number of touch regions have touch signals exceeding a minimal strength threshold;
if the groove analysis is to be performed, performing the groove analysis on the touch regions having touch signals exceeding the minimal strength threshold by determining at least one touch region to have a groove that is between a second touch region and a third touch region;
wherein at least one touch region is determined to have a groove based on the touch region having a touch signal indicating contact with a user's finger, but being lesser in strength than touch signals from surrounding touch regions; and
excluding the at least one touch region from a determination of touch regions corresponding to the plurality of tactile inputs;
if the groove analysis is not to be performed, determine the touch signal for at least one touch region to represent a single touch.

13. The method of claim 12, wherein each of the plurality of tactile input comprises a touch from a finger of a user.

14. The method of claim 12, wherein the determining the touch signal strength further comprises sensing a capacitive signal generated by capacitive sensors in the tactile input device.

15. The method of claim 12, wherein determining the groove further comprises determining that the at least one touch region has a touch strength signal that is less than a touch strength signal of the second touch region and the third touch region wherein the second touch region comprises an touch region adjacent to the at least one touch region in a first direction and the third touch region comprises an touch region adjacent to the at least one touch region in a direction opposite the first direction.

16. The method of claim 12, wherein determining the groove further comprises determining that the at least one touch region has a touch strength signal that is less than a touch strength signal of the second touch region and the third touch region wherein the second touch region comprises an touch region adjacent to the at least one touch region in a first direction and the third touch region comprises an touch region spaced apart from the at least one touch region in a direction opposite the first direction.

17. The method of claim 12, wherein the determination of touch regions corresponding to the plurality of tactile inputs comprises applying a centroid algorithm to a data frame of touch signal strengths excluding the excluded at least one touch region to determine XY coordinates of touch inputs.

18. The method of claim 17, further comprising merging two determined touch inputs based on the determined XY coordinates being separated by a distance of less than 10 millimeters.

* * * * *